Jan. 25, 1955  K. G. ÅHLÉN  2,700,444
CAM OPERATED SHIFTING DEVICE FOR CLUTCHES
Filed March 6, 1950  7 Sheets-Sheet 1

Jan. 25, 1955  K. G. ÅHLÉN  2,700,444
CAM OPERATED SHIFTING DEVICE FOR CLUTCHES
Filed March 6, 1950  7 Sheets-Sheet 3

United States Patent Office 2,700,444
Patented Jan. 25, 1955

2,700,444

CAM OPERATED SHIFTING DEVICE FOR CLUTCHES

Karl Gustav Åhlén, Stockholm, Sweden, assignor, by mesne assignments, to Jarvis C. Marble, New York, N. Y., Leslie M. Merrill, Westfield, N. J., and Percy H. Batten, Racine, Wis., trustees Application March 6, 1950, Serial No. 147,799

Claims priority, application Sweden March 7, 1949

12 Claims. (Cl. 192—93)

The present invention relates to spring actuated devices, particularly friction clutches, and has for its general object the improved means for shifting the spring load on the devices to effect engagement or disengagement and in certain instances to provide a neutral position in which the spring load is rendered ineffective.

In automotive practice, spring loaded friction clutches of the so-called over-center type are often used in which upon engagement or disengagement, the spring system is shifted against the action of the spring force by means of levers which transmit the manual power or the servomotor power from the control station or from a servomotor to the shifting mechanism of the clutch with substantially instant mechanical advantage which may be as low as one to one or even less. However, the required shifting power varies in accordance with the spring characteristic. Consequently, this must be regarded as a serious drawback of those older constructions having a constant mechanical advantage in the power transmitting mechanism because with manual control and especially for large clutches the lever system becomes impractically large from the standpoint of construction and with respect to the space required. If in lieu thereof a servomotor is employed, such motor must be designed to develop the greatest power required, and consequently its capacity is not utilized in an effective manner during the greater part of its working stroke.

In large clutches it has also proved necessary to use special torsion springs or damping pistons by means of which an equalization of the energy of the spring system is obtained. Otherwise the energy would be violently released upon engagement, thus causing shocks or a greater momentary clamping force than that for which the clutch has been designed.

The present invention provides an improved arrangement of the shifting mechanism in clutches of the type indicated, whereby the shifting takes place softly and at the same time the available manual power or servomotor power is most effectively utilized. Furthermore, the advantage is obtained that that part of the shifting mechanism which is carried by the clutch is not in contact with the fixed portions of the apparatus in the end or terminal positions of the clutch. Consequently, a possible inexact centering does not cause vibrations or unnecessary wear of the clutch parts. Furthermore, devices embodying the invention are characterized by great simplicity and safe operation, and require less space than earlier known constructions. During engagement, good damping is also obtained, and consequently special damping pistons or the like are dispensed with.

The apparatus for shifting the spring system of the clutch is substantially characterized in that the transmission of the shifting power takes place via a member provided with cam surfaces of varying pitch, this pitch being preferably related in such a manner to the force-displacement characteristic of the spring system that the required shifting power becomes substantially constant on one or both sides of the neutral position, depending upon whether the clutch is of the single or multiple type.

Preferably, the shifting mechanism consists of a shift member in the form of a ring or the like which is axially movable while being turned and which during the turning movement is guided by one or more cam grooves having a contour formed peripherally and axially, in relation to the spring force which varies during shifting, in such manner that a greater turning movement of the member is required to move it axially a certain distance when the spring force is greater than is required to move it the same distance when the spring force is smaller.

In the end or terminal positions, the cam grooves are wider in order to obtain the desired clearance between the fixed and movable portions of the shifting mechanism.

In double-acting clutches it is in many cases valuable to be able to lock the pressure plate in neutral position with both friction plates disengaged. This feature is obtained in a simple manner by providing the cam grooves with projections on both sides of the central position of the spring system.

Suitable embodiments of the invention satisfying the conditions indicated above are illustrated in the annexed drawings and will be explained more in detail in the following description, it being understood that the invention is not limited to such examples.

The embodiments of the invention shown by way of example are described hereinafter as applied to clutches mounted in hydraulic torque converters, said clutches having for their object to engage and disengage, respectively, the hydraulic converter. However, the invention is not limited to this combination but its idea may be utilized in any coupling of over-center type as well as in similar systems when it applies to shifting a spring system.

Figures 1, 5, 10 and 11 constitute a complete example of the invention. For this reason, the elements included therein and their modes of operation are first described in detail. Figures 2 to 4, 6 to 9, 12 and 13 are then described in as far as they differ with regard to their construction.

Figure 1:
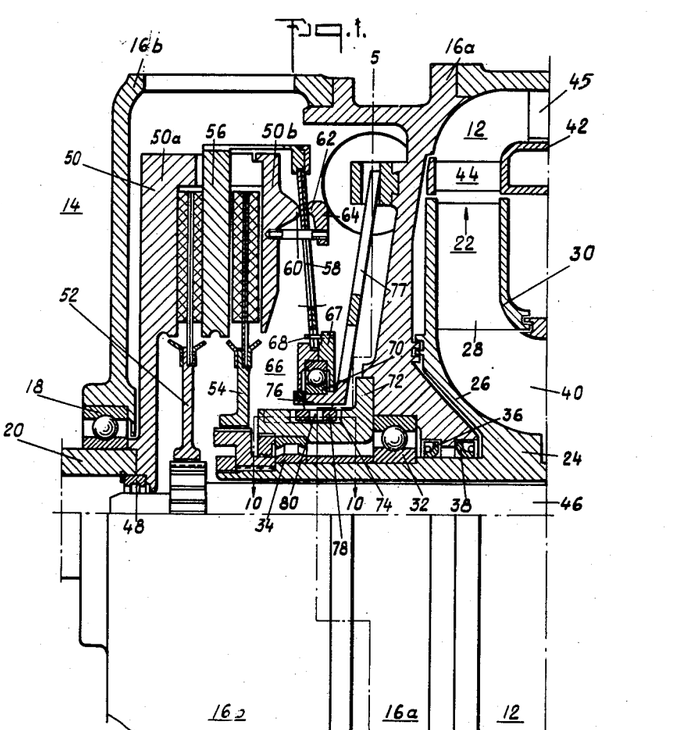
Fig. 1 shows a double-acting clutch of over-center type with a shifting mechanism according to the invention.

In the drawings, the numeral 12 designates the hydraulic converter and 14 the clutch cooperating therewith. Only a small part of the converter 12 nearest to the clutch 14 is shown since its construction as such is not per se a part of this invention.

The stationary housing 16a contains the rotating parts of the converter, pump and turbine, while its extension 16b as a guard casing encloses the clutch 14, and furthermore carries the motor shaft 20 in a bearing 18.

The pump part 22 comprises a drive shaft 24 with pump member 26 carrying pump blades 28 and disc 30. The drive shaft is mounted coaxially with the motor shaft in the stationary housing 16a by means of ball and roller bearings 32 and 34 respectively, and is provided with packings 36 and 38 which reduce the outward leakage from the circuit 40 of the converter, said circuit being filled with fluid under pressure.

Of the turbine part 42 only the first blade ring 44 nearest to the pump outlet is visible in the figure, but in reality several blade rings with guide blade rings 45 therebetween are utilized, which latter may be fixed to the stationary housing 16a while the turbine blade rings are carried by the turbine or secondary shaft (not visible in the figure). The last mentioned shaft transmits the turbine moment to the drive shaft proper via a freewheeling device of such a design as to establish mechanical connection between said shafts as long as the hydraulic system is operating (hydraulic drive).

However, provision is also made in a known manner for direct drive while by-passing the hydraulic system. This may be effected by the central shaft 46, which at one end is fixedly connected with the drive shaft proper, and which at the other end carries one of the two clutch plates in the double clutch 14 by means of which the shifting from hydraulic drive to direct drive or vice versa is effected. The bearing 48 supports the shaft 46. The general organization of parts just described, for providing alternative converter and direct drives, is known and of the general type disclosed in U. S. Patent No. 1,900,119 granted March 7, 1933 on the application of Alf Lysholm et al.

The clutch 14 is built together with the flywheel 50 which has the form of a double plate between whose parts 50a and 50b two friction or driven plates 52 and 54 provided with suitable friction facings are disposed. The friction plate 54 is fixed to the pump shaft 24 and the friction plate 52 is fixed to the direct shaft 46. A pressure plate 56 is axially movable in the space between the two friction plates, and engages either one or the other of the friction plates to firmly engage a driven part of the clutch, the required clamping force being produced by means of a Belleville washer 58 which is fixed to the pressure plate at its outer circumference, and furthermore pivotally movable between the two edges 60 and 62 of the plates 50b and 64 respectively. Additionally, at its inner circumference the Belleville washer is axially displaceable by means of a shifting mechanism 66, the washer 58 projecting into a peripheral groove in the ring 67 of this mechanism. Consequently, displacement of the ring also causes the center portion of the Belleville washer to follow. The ring 67 rotates with the washer 58 through the medium of a pin 68 which is fixed in the ring and projects through the washer in a narrow, radially extending slot, which therefore, like the depth of the peripheral groove, permits a certain radial movement between ring and washer, which occurs during the shifting, i. e. when the spring system passes over the center or neutral position.

The member 67, the washer 58 and the pressure plate 56 rotate with the clutch. For this reason a bearing 70 is located between the member 67 and the shifting mechanism proper, which, as will be seen from Fig. 1, consists of a reaction member in the form of a sleeve 72 fixed to the stationary housing 16a. This sleeve is provided with one or more (in this case three) cam grooves 74 of special form hereinafter more fully described in detail, in which the pins 80 secured to the control member 76 move, these pins being provided with rollers 78. The control member 76 is thereby displaced axially in accordance with the form of the grooves 74, and this movement is transmitted to the member 67 via the bearing 70. The position of the grooves in relation to the Belleville washer 58 is such that during the turning movement of the control member 76 between the terminal portions of the grooves the center portion of the washer 58 and the member 67 are displaced axially from one terminal position to another terminal position. These terminal positions are located on opposite sides of the center position, the pressure plate 56 being in like manner adjusted so as to engage the other friction plate.

Figure 10:
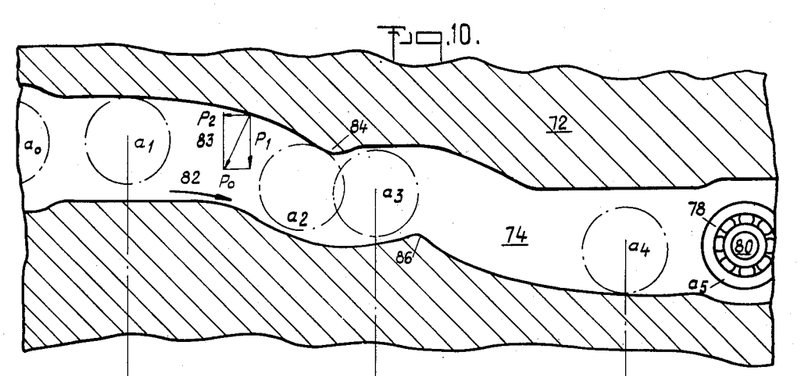
Fig. 10 shows in plan the cam groove which actuates the shift member.
Figure 11:
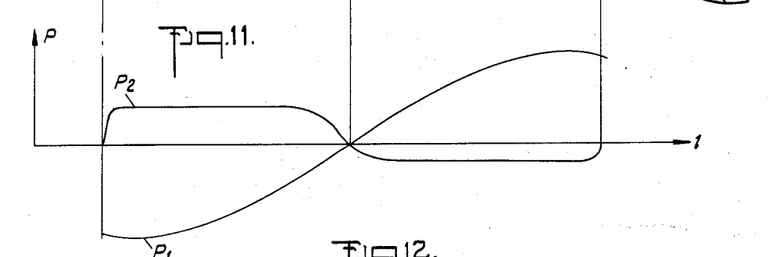
Fig. 11 illustrates diagrammatically the variation of the spring force and of the shifting power along the cam groove.

Figures 10 and 11 show how the device operates in accordance with the invention during the shifting of the clutch. One of the cam grooves 74 has been projected on to the plane of the paper to better illustrate its shape as well as the position of the roller 78 in relation to the same during different phases of the shifting operation. Figure 11 indicates diagrammatically with reference to Fig. 10 the value of the axial component of the spring force as well as the tangential component $P_1$ and the shifting power $P_2$ during such a procedure.

The roller 78 is assumed to be in the initial terminal position $a_0$, the pressure plate 56 holding the friction plate 54 coupled with the force $P_1$. If now the control member 76 is turned in the direction of the arrow 82, the upper cam groove wall and the roller 78 contact each other about at $a_1$, and at the same time due to the contour of the groove the displacement of the control member 76 to the left in Fig. 1 is started so that the pressure plate 56 is moved away from the friction plate 54 and the whole spring force is absorbed by the shifting mechanism. During the further displacement from $a_1$ to $a_2$ the spring force $P_1$ falls continuously more and more and approaches zero value, which is reached at the shifting point or when the roller is in the position $a_3$. By making the groove wall with varying pitch and preferably so that a smaller pitch corresponds to a greater spring force and conversely, a greater pitch corresponds to a smaller spring force, an equalizing of the required shifting power $P_2$ is obtained which thus will have a relatively constant value during the greater part of the displacement. The parallelogram of forces at 83 will illustrate this condition. $P_1$ is the axial reaction force from the groove wall which counteracts the force $P_1$ of the spring system, $P_0$ is the normal force against said wall and $P_2$ is the required shifting force for turning the operating ring.

In the position $a_3$ the spring system is in unstable equilibrium, with the pressure plate 56 set in neutral position between the two friction plates. The driving motor may be positively disconnected and the spring system held in neutral position by the provision of the projections 84 and 86 on both sides of this position, as shown in the drawings, in order to prevent vibrations or the like from displacing the spring system from the middle or neutral position.

If the control member is turned still more so that the roller 78 passes over the elevation 86, the spring force, which is now acting in the opposite direction, tends to drive the operating ring in the same direction as the shifting force. However, a certain damping is obtained due to the friction between groove and roller, the influence of such friction being proportionally greater along that part of the path where the pitch is small and at the same time the spring force is great. When the position $a_4$ has been reached, the pressure plate presses with full force against the friction plate 52 and the spring force is entirely unloaded from the shifting mechanism. During the further turning movement of control member 76 to the position $a_5$ the roller 78 completely clears the walls of the groove, which for this purpose has been made wider. The advantage of this last mentioned feature is that eccentricity, if any, between the rotating clutch parts and the reaction member 72 does not affect the control member 76, which thus is not prevented from following any movement of the member 67. This improvement together with the soft shifting movement, particularly at the instant of engagement of the pressure plate 56, with the friction plates 52, and 54 respectively, results in materially increasing the life of a clutch as compared with earlier known types.

The control member 76 in this embodiment is turned by means of a forked arm 77 (see Fig. 5) which is pivotally connected to the control member 76, and whose end 90 is engaged and actuated by a servomotor 88 is in the form of a ball disposed in a bore in the piston rod 92, whereby the required range of movement between them is permitted.

Figure 5:
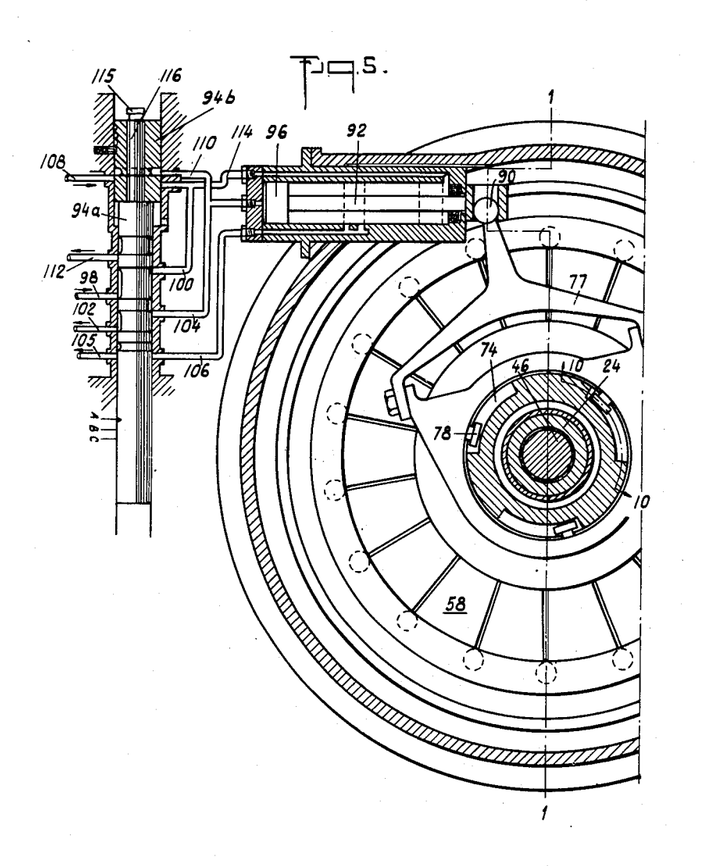
Fig. 5 is a sectional view on the line 5—5 of Fig. 1 and showing a servomotor and slide control valve.

The servomotor operates by oil under pressure which is supplied via a two part control slide $94_a$, $94_b$ which is actuated from the control station. In the position A of the slide 94 (as shown in Fig. 5) the piston 96 is held in the position shown in the figure by oil from the supply conduits 98 and 100, the discharge conduits 102 and 104 being vented. In this position of the piston 96, the clutch plate 52 is engaged by the pressure plate 56. If the slide 94 is then moved down to the position B, oil is discharged through the conduits 105 and 106 and oil is supplied through conduits 108 and 110. Therefore, the piston 96 will move to the middle position and move the pressure plate 56 to the neutral position. If the slide is moved further to the position C, oil is supplied through the conduits 98 and 104 and oil is discharged through the conduits 100, 112, so that the piston moves over to the opposite terminal position in which position the clutch plate 54 is engaged by the pressure plate 56.

Upon moving the slide back to the position B the conduits 108, 114 become supply conduits and 105, 106 discharge conduits so that the piston is moved back from the right to the middle position and by moving the slide further toward A the piston moves to the initial position shown in Figure 5.

By dividing the slide into the two parts 94a and 94b, which are axially movable a short distance relative to each other due to the lost motion pin 116 and stop ring 115, fixed to the part 94b and extending through a bore in the part 94a, it is possible to move the pressure plate 56 from the neutral position to a clutch plate engaging position either toward the friction plate 52 or 54 depending upon the direction of movement of the slide.

Figure 2:
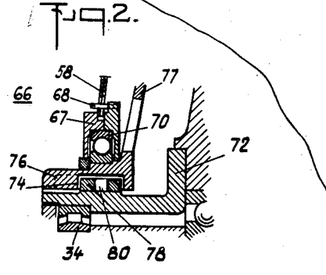
Fig. 2 is a fragmentary sectional view showing an alternative embodiment of the shifting mechanism shown in Fig. 1.

Fig. 2 shows an alternative embodiment of the shifting mechanism 66 in which the reaction member 72 carries pins 80 with rollers 78 which run in cam grooves 74 formed in the control member 76. It will be understood that the operation is exactly the same with the above described device as with that earlier described in connection with Fig. 1.

Figure 3:
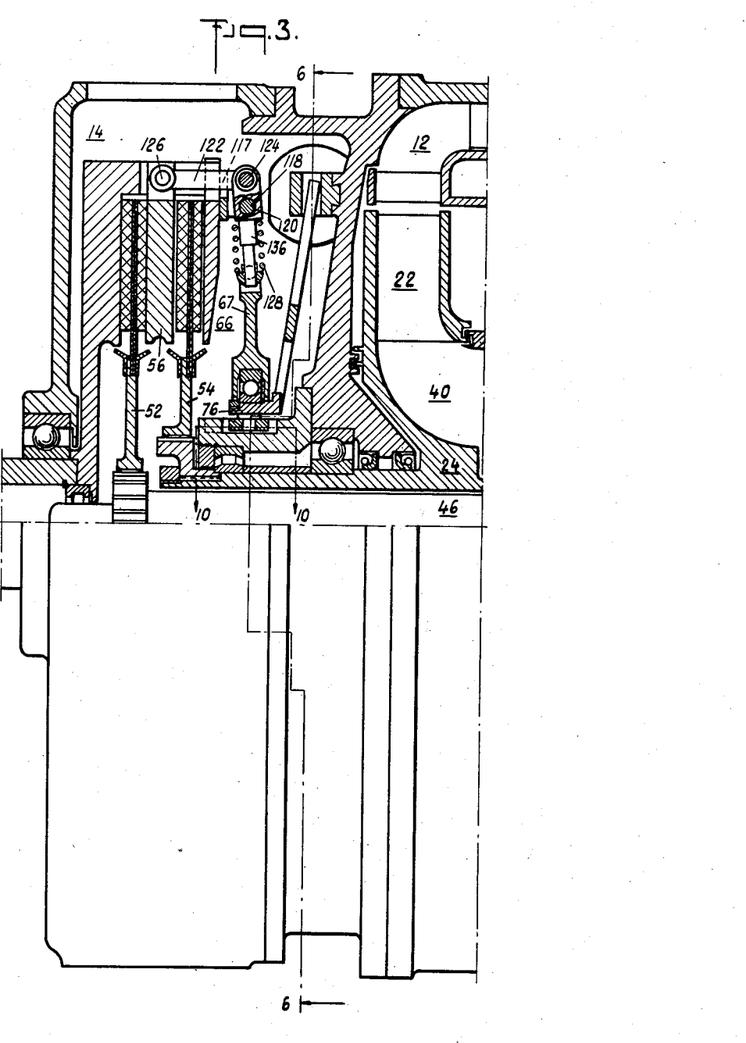
Fig. 3 shows another type of spring system with a shifting mechanism of the same type as in Fig. 1.
Figures 6, 7:
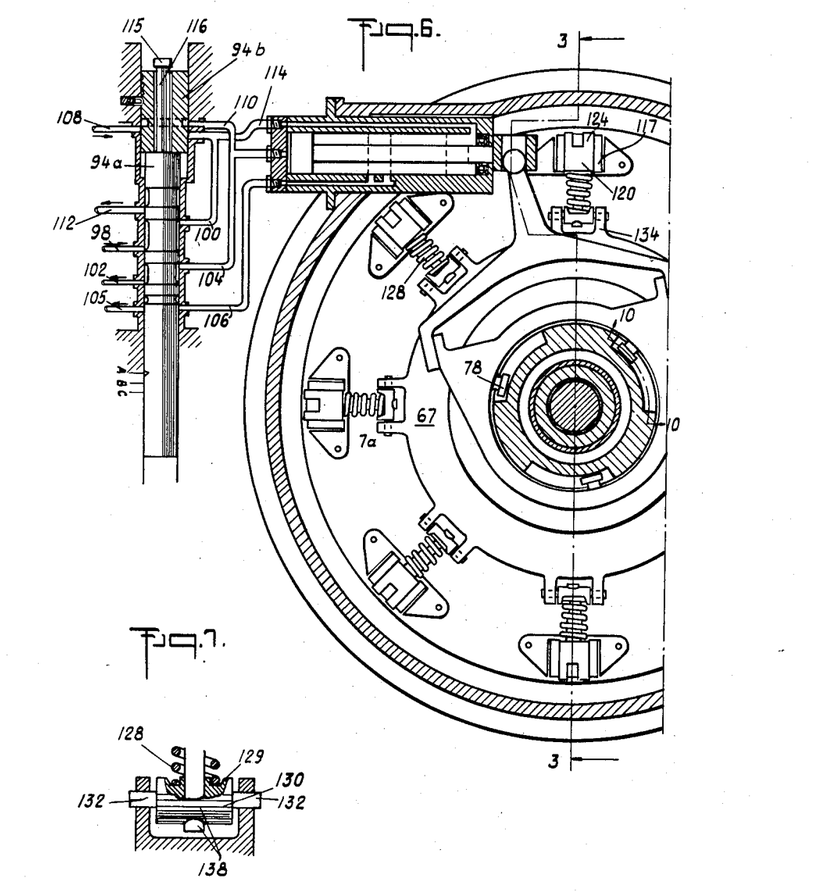
Fig. 6 is a sectional view on the line 6—6 of Fig. 3 and showing a servomotor and slide control valve.
Fig. 7 is a fragmentary sectional view of the spring system on the line 7—7 of Fig. 3.

The clutch disclosed in Figs. 3, 6 and 7 has a spring system somewhat different than that described above, but the associated shifting mechanism is the same.

The spring system is, in a known manner, made up of a number of helical spring actuated lever arms which provide the required clamping force. A member 120 is pivotally mounted between two lugs of a bracket 117 by means of a pin 118. The upper forked part of member 120 pivotally carries one end of the link 122 by the pin 124, while the other end of the link is pivotally connected to the pressure plate 56 by the pin 126. The axial clamping force is provided by a helical spring 128 which is fixed between a shoulder on the member 120 and an annular groove 129, (Fig. 7) in a cylindrical member 130 provided with pins 132, which member is pivotally mounted in the lugs 134 of the member 67.

The helical spring is guided by the rod 136 (Fig. 3) constituting the lower part of the member 120. In order to compensate for the changing distance between the ends of the spring during the shifting operation the cylindrical member 130 is provided with a bore 138 in which the rod 136 slides.

A spring system according to the embodiment just described provides a clamping force varying in the same way as shown in Fig. 11, and therefore the shifting mechanism 66 and the cam grooves 74 are designed in the same manner as described earlier with reference to Figs. 1, 10 and 11.

Figure 4:
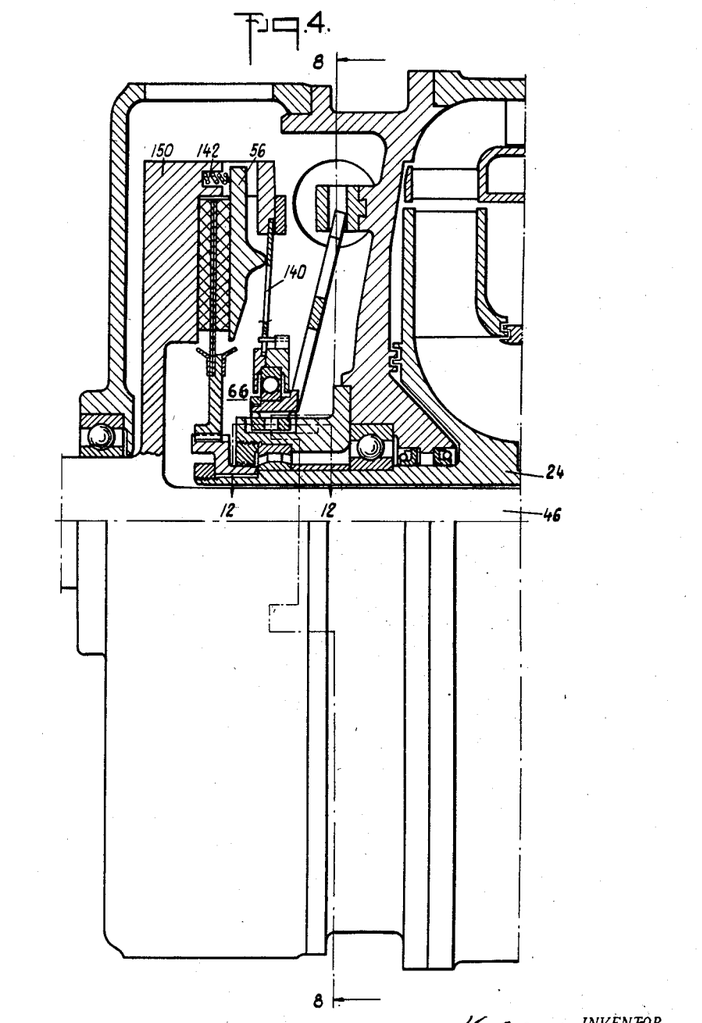
Fig. 4 is a view similar to Fig. 1 showing a single-acting clutch with a shifting mechanism according to the invention.
Figures 8, 9:
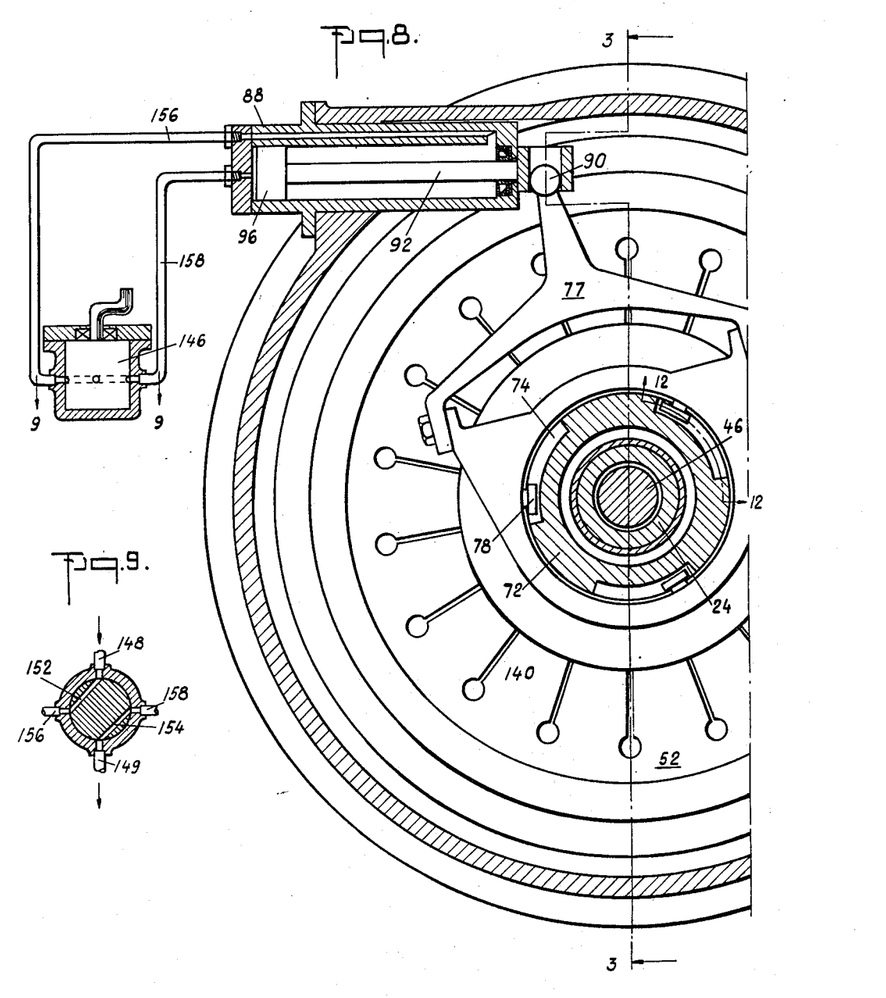
Fig. 8 is a sectional view on the line 8—8 of Fig. 4 showing a servomotor and modified form of control valve.
Fig. 9 is a sectional view of the control valve on the line 9—9 of Fig. 8.

The clutch illustrated in Figs. 4, 8 and 9 is of the single-acting type for engaging and disengaging the hydraulic system. At its outer circumference the Belleville washer 140 is fixed in the flywheel 150 and its hub portion may be displaced by a shifting mechanism of fundamentally the same design as disclosed and described in the two earlier constructions. Helical springs 142 act on the pressure plate 56 to disengage the latter from the friction plate upon shifting from engaged to disengaged position and, in the reverse direction, to damp the force of the engagement which takes place by reason of the spring force operating in the same direction as the shifting movement.

Figure 12:
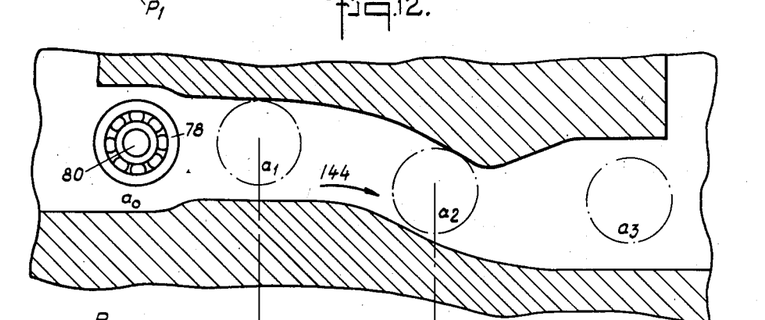
Fig. 12 shows in plan the cam groove for a single-acting clutch.
Figure 13:
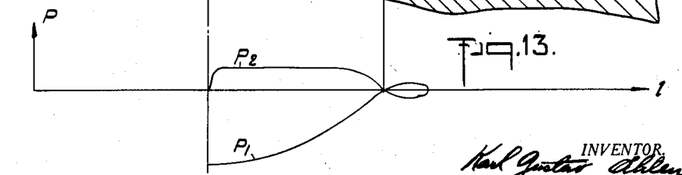
Fig. 13 illustrates diagrammatically the variation of the spring force during the shifting of the single-acting clutch according to Fig. 4.

The clutch being single-acting, the cam groove will have the appearance shown in Fig. 12 while the axial component $P_1$ of the spring force against the pressure plate and the required shifting force $P_2$ will be as shown in Fig. 13.

In the position $a_0$ the rollers 78 are entirely free, the pressure plate 56 pressing against the friction plate 52. If the control member 76 is shifted in the direction of the arrow 144 the rollers in the position $a_1$ will contact the wall of the groove and begin to disengage the pressure plate from the friction plate. In the position $a_2$ the Belleville washer passes over dead center and then moves clear of the cam groove to the position $a_3$ which corresponds to the opposite terminal position of the Belleville washer. Upon engagement, the movement takes place in the opposite direction, the movement towards the engaged position from $a_2$ to $a_1$ to $a_0$ being accelerated by the increasing spring force. However, at the same time the influence of the friction force is increasing, due to the inclination of the path, thus giving the greatest damping action at the end of the shifting movement when the pressure plate is about to engage the friction plate.

The shifting of the clutch as shown in Figs. 8 and 9 takes place by means of a servomotor 88 which is controlled by a valve 146. The conduit 148 supplies oil under pressure while the conduit 149 constitutes the outlet. Depending upon the position of the bores 152 and 154 in relation to the four connections in the valve casing, supply is obtained through the conduit 156 and discharge via the conduit 158, or vice versa. Consequently, the servomotor piston and the shifting mechanism 66 assume either one terminal position or the other and the clutch is either in engaged or disengaged position.

It will be obvious to those skilled in the art that various changes may be made in the invention without departing from the spirit and scope thereof and, therefore, the invention is not limited by that which is shown in the drawings and described in the specification but only as indicated in the appended claims.

I claim:

1. The combination with a friction clutch having spring means for engaging the clutch elements and having a shift member for controlling the spring load applied to said elements, of an actuating mechanism for shifting said member comprising an axially fixed reaction member, a control member having limited turning movement between two terminal positions, cam means comprising cam surfaces and cam follower means providing operative engagement between said control member and said reaction member, said cam means being operative to cause axial movement of the control member in predetermined relation to its turning movement when the control member is turned within the range between said terminal positions and said cam follower means further being disengaged from said cam surfaces in both of said terminal positions to leave said control member free from said reaction member when the mechanism is in either of said terminal positions, and means providing an axially fixed connection between said control member and said shift member.

2. The combination with a spring loaded friction clutch in which the spring load is provided by spring means having a variable force-displacement characteristic and a shift member for controlling the spring load applied to the clutch elements, of an actuating mechanism for shifting said member comprising an axially fixed reaction member, a control member connected to said shift member and having limited turning movement between two terminal positions, cam means comprising a groove in said reaction member, cam follower means on said control member engaging said groove, said cam means having a variable pitch characteristic related to said force-displacement characteristic to provide a relatively constant force-displacement characteristic for the control member during movement thereof to actuate said shift member and move said clutch elements.

3. The combination with a spring loaded friction clutch in which the spring load is provided by spring means having a given force-displacement characteristic and a shift member for controlling the spring load applied to the clutch elements, of an actuating mechanism for shifting said member comprising an axially fixed reaction member, a control member connected to said shift member and having limited turning movement between two terminal positions, cam means comprising a groove in said reaction member, cam follower means on said control member engaging said groove, said cam means having a variable pitch characteristic for changing the mechanical advantage of the cam to provide a predetermined force-displacement characteristic for axial movement of the control member to actuate said shift member and move said clutch elements.

4. The combination with a clutch having spaced clutch plates and an intermediate pressure plate movable from a neutral position into engagement with either plate, of an actuating mechanism comprising over center spring means attached to said pressure plate, a shift member attached to said spring means, a control member rotatably mounted on said shift member but fixed against axial movement relative thereto, an axially fixed reaction member, cam means operatively associated with said control member and said reaction member, said cam means being operable to move said spring means over center to move said pressure plate into engagement with either clutch plate, and locking means to lock said pressure plate in neutral position.

5. The combination with a clutch having a clutch plate and a pressure plate movable into and out of engagement with said clutch plate, of an actuating mechanism comprising over center spring means attached to said pressure plate, a shift member attached to said spring means, a control member rotatably mounted on said shift member but fixed against axial movement relative thereto, an axially fixed reaction member, cam grooves in said reaction member, cam followers on said control member engaging said cam grooves, said control member being rotatable between terminal positions to move said cam followers in said cam grooves, the contour of said cam grooves being such as to move said control member and said shift member to move said spring means over center and displace said pressure plate into or out of engagement with said clutch plate, and the contour of said cam grooves further being such that said cam followers are out of contact with the walls of the grooves in said terminal positions.

6. The combination with a clutch having spaced clutch plates and an intermediate pressure plate movable from a neutral position into engagement with either plate, of an actuating mechanism comprising over center spring means attached to said pressure plate, a shift member attached to said spring means, a control member rotatably mounted on said shift member but fixed against axial movement relative thereto, an axially fixed reaction member, cam grooves in said reaction member, cam followers on said control member engaging said cam grooves, said control member being rotatable between terminal positions to move said cam followers in said cam grooves, the contour of said cam grooves being such as to move said control member and said shift member to move said spring means over center and displace said pressure plate to engagement with one of said clutch plates and into engagement with the other clutch plate upon movement of said control member in the opposite direction, and the contour of said cam grooves further being such that said cam followers are out of contact with the walls of the grooves in said terminal positions.

7. The combination with a clutch having a clutch plate and a pressure plate movable into and out of engagement with said clutch plate, of an actuating mechanism comprising over center spring means attached to said pressure plate, a shift member attached to said spring means, a control member rotatably mounted on said shift member but fixed against axial movement relative thereto, an axially fixed reaction member, cam grooves in said reaction member, cam followers on said control member engaging said cam grooves, said control member being rotatable to move said cam followers in said cam grooves, the contour of said cam grooves being such as to move said control member and said shift member to move said spring means over center and displace said pressure plate into or out of engagement with said clutch plate, the contour of said cam grooves being also formed with a variable pitch to compensate for the changing force-displacement characteristic of the spring means as said spring means moves over center, the terminal ends of said cam grooves being enlarged whereby whereby said followers are out of contact therewith in their terminal positions.

8. The combination with a clutch having spaced clutch plates and an intermediate pressure plate movable from a neutral position into engagement with either plate, of an actuating mechanism comprising over center spring means attached to said pressure plate, a shift member attached to said spring means, a control member mounted on said shift member but fixed against axial movement relative thereto, an axially fixed reaction member, cam grooves in said reaction member, cam followers on said control member engaging said cam grooves, said control member being rotatable to move said cam followers in said cam grooves, the contour of said cam grooves being such as to move said control member and said shift member to move said spring means over center and displace said pressure plate into engagement with one of said clutch plates and into engagement with the other clutch plate upon movement of said control member in the opposite direction, the contour of said cam grooves being also formed with a variable pitch to compensate for the changing force-displacement characteristic of the spring means as said spring means moves over center.

9. The combination with a clutch having spaced clutch plates and an intermediate pressure plate movable from a neutral position into engagement with either plate, of an actuating mechanism comprising over center spring means attached to said pressure plate, a shift member attached to said spring means, a control member rotatably mounted on said shift member but fixed against axial movement relative thereto, an axially fixed reaction member, cam grooves in said reaction member, cam followers on said control member engaging said cam grooves, said control member being rotatable to move said cam followers in said cam grooves, the contour of said cam grooves being such as to move said control member and said shift member to move said spring means over center and displace said pressure plate into engagement with one of said clutch plates and into engagement with the other clutch plate upon movement of said control member in the opposite direction, the contour of said cam grooves being also formed with a variable pitch to compensate for the changing force-displacement characteristic of the spring means as said spring means moves over center, the terminal ends of said cam grooves being enlarged whereby said followers are out of contact therewith in their terminal positions.

10. The combination with a clutch having spaced clutch plates and an intermediate pressure plate movable from a neutral position into engagement with either plate, of an actuating mechanism comprising over center spring means attached to said pressure plate, a shift member attached to said spring means, a control member rotatably mounted on said shift member but fixed against axial movement relative thereto, an axially fixed reaction member, cam grooves in said reaction member, cam followers on said control member engaging said cam grooves, said control member being rotatable to move said cam followers in said cam grooves, the contour of said cam grooves being such as to move said control member and said shift member to move said spring means over center and displace said pressure plate into engagement with one of said clutch plates and into engagement with the other clutch plate upon movement of said control member in the opposite direction, the contour of said cam grooves being also formed with a variable pitch to compensate for the changing force-displacement characteristic of the spring means as said spring means moves over center, the terminal ends of said cam grooves being enlarged whereby said followers are out of contact therewith in their terminal positions and said cam grooves being provided with locking means to lock said followers and associated parts in neutral position.

11. The combination with a clutch having spaced clutch plates and an intermediate pressure plate movable from a neutral position into engagement with either plate, of an actuating mechanism comprising over center spring means attached to said pressure plate, a shift member attached to said spring means, a control member rotatably mounted on said shift member but fixed against axial movement relative thereto, an axially fixed reaction member, cam grooves in said reaction member, cam followers on said control member engaging said cam grooves, said control member being rotatable to move said cam followers in said cam grooves, the contour of said cam grooves being such as to move said control member and said shift member to move said spring means over center and displace said pressure plate into engagement with one of said clutch plates and into engagement with the other clutch plate upon movement of said control member in the opposite direction, the contour of said cam grooves being also formed with a variable pitch to compensate for the changing force-displacement characteristic of the spring means as said spring means moves over center, the terminal ends of said cam grooves being enlarged whereby said followers are out of contact therewith in their terminal positions and the mid point of said cam grooves being formed with inwardly extending locking projections to lock said followers and associated parts in neutral position.

12. The combination with a clutch having spaced clutch plates and an intermediate pressure plate movable from a neutral position into engagement with either plate, of an actuating mechanism comprising over center spring means attached to said pressure plate, a shift member attached to said spring means, a control member rotatably mounted on said shift member but fixed against axial movement relative thereto, fluid pressure operated servo-motor means attached to said control member for rotating the same, an axially fixed reaction member, cam grooves in said reaction member, cam followers on said control member engaging said cam grooves, said control member being rotatable to move said cam followers in said cam grooves, the contour of said cam grooves being such as to move said control member and said shift member to move said spring means over center and displace said clutch plate into engagement with one of said clutch plates and into engagement with the other clutch plate upon movement of said control member in the opposite direction, the contour of said cam grooves being also formed with a variable pitch to compensate for the changing force-displacement characteristic of the spring means as said spring means moves over center and said cam grooves being provided with locking means to lock said followers and associated parts in neutral position.

References Cited in the file of this patent

UNITED STATES PATENTS

| | | |
|---|---|---|
| 1,192,793 | Manthey | July 25, 1916 |
| 1,270,529 | Koechlin | June 25, 1918 |
| 2,116,739 | Eason | May 10, 1938 |
| 2,181,711 | Sinclair | Nov. 28, 1939 |
| 2,211,191 | Wolfram | Aug. 13, 1940 |
| 2,380,677 | Schjolin | July 31, 1945 |
| 2,399,886 | Odevseff | May 7, 1946 |
| 2,574,204 | Woody et al. | Nov. 6, 1951 |
| 2,603,327 | King | July 15, 1952 |

FOREIGN PATENTS

| | | |
|---|---|---|
| 262,721 | Great Britain | May 5, 1927 |